June 22, 1954     C. C. TROOP     2,681,518
BULLDOZER WITH ADJUSTABLY MOUNTED BLADE
Filed May 29, 1950     2 Sheets-Sheet 1

Charles C. Troop
INVENTOR.

June 22, 1954  C. C. TROOP  2,681,518
BULLDOZER WITH ADJUSTABLY MOUNTED BLADE
Filed May 29, 1950  2 Sheets-Sheet 2
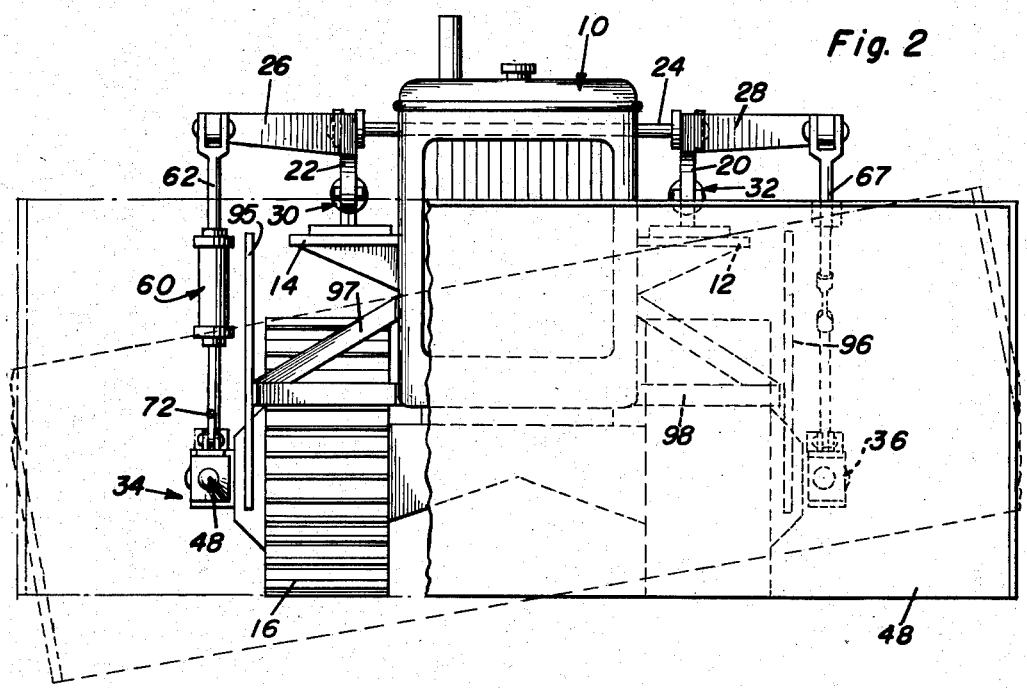
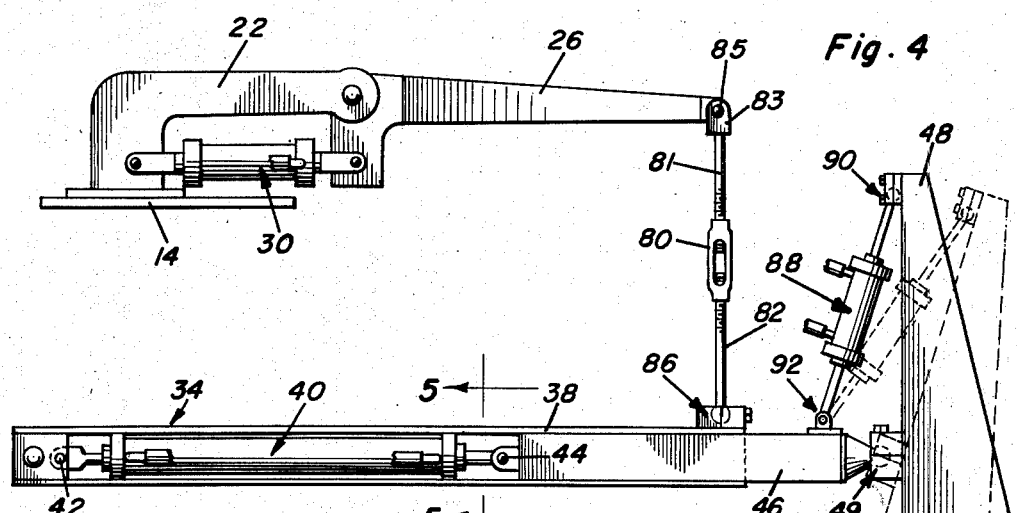
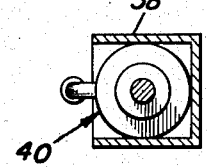
Charles C. Troop
INVENTOR.

Patented June 22, 1954

2,681,518

UNITED STATES PATENT OFFICE 2,681,518

BULLDOZER WITH ADJUSTABLY MOUNTED BLADE

Charles C. Troop, Pottstown, Pa.

Application May 29, 1950, Serial No. 164,995

4 Claims. (Cl. 37—144)

This invention relates to improvements in tractor-mounted, earth-working implements of the type which include a grader blade or mold board unit mounted at the front of the tractor and adapted to be pushed ahead of the tractor.

An object of this invention is to structurally and functionally improve the means of attaching a mold board to the tractor for performing various operations, such as grading or levelling.

A further object of this invention is to mount a pair of supports on the fenders of the crawler type tractor, whereby shocks due to irregularities in the ground or due to the striking of rocks, tree stumps and the like are not transmitted directly to the normal means of supporting the mold board, conventionally arranged on the tractor tread mounting assemblies, but rather are transmitted only if the entire chassis or frame of the tractor is tilted, inasmuch as the fenders are attached thereto.

Ancillary objects and features of importance will become apparent in following the description of the illustrated forms of the invention.

In the drawings:

Figure 2 is a front view of the device of Figure 1, portions being broken away in section to illustrate detail of construction, and the mold board being shown in an adjusted position in phantom;

Figure 4 is a side view similar to that in Figure 3 but showing a slight modification due to rearrangement of various elements; and Figure 5 is a transverse sectional view illustrating details of construction of one of the beams and taken substantially on the line 5—5 of Figure 4 and in the direction of the arrows.

Figure 1:
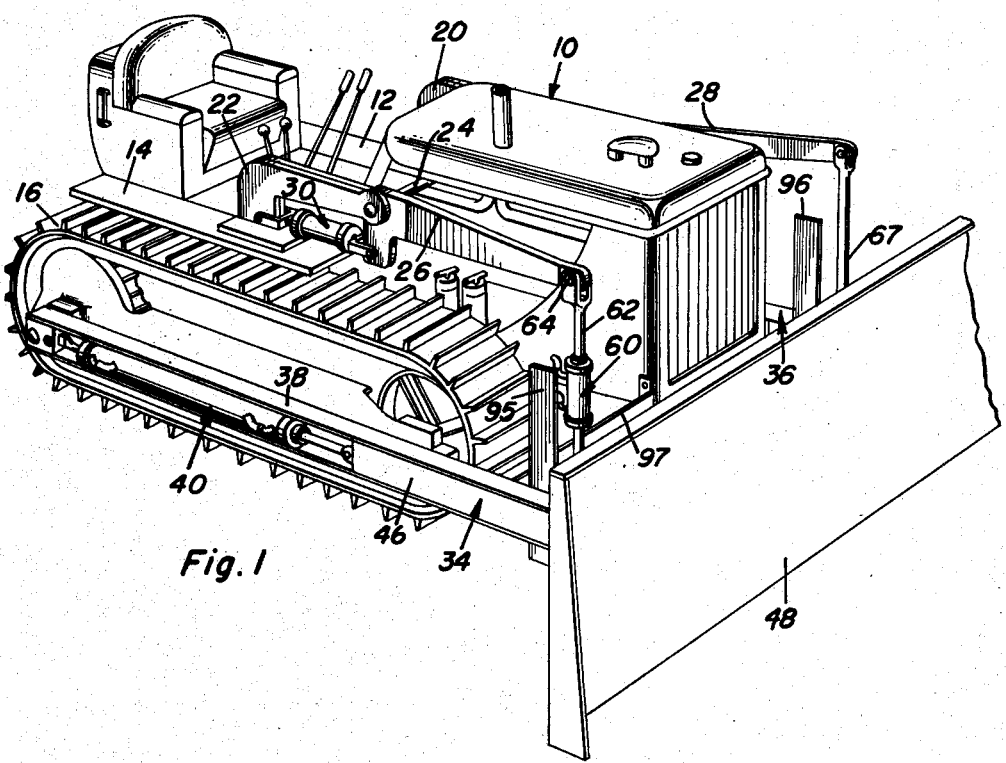
Figure 1 is a perspective view of a conventional tractor having the improved assembly for holding the mold board thereon.

A conventional tractor 10 of known description is illustrated and includes various structural elements which are well known. Among the structural elements are the fenders 12 and 14 which are mounted in the usual way above the treads 16 of the tractor.

The substantially L-shaped supports 20 and 22 are mounted on the fenders 12 and 14 rigidly, with the longer leg of each projecting forwardly of the tractor. A single pivot 24 passes through openings in the forward ends of the supports and is carried thereby. This pivot is secured to the cranks or lift arms 26 and 28 which are attached intermediate their ends thereto. The inner or lower ends of the lift arms 26 and 28 have one end of the cylinder-piston assemblies 30 and 32 pivoted thereto, while the other ends thereof are pivoted to the shorter legs of the supports 20 and 22. The purpose of the piston-cylinder assemblies is to raise the lift arms.

At this point, it will be noted that the drawings illustrate various piston and cylinder assemblies which are purely conventional in nature and, similarly, controls therefor are indicated schematically by the handles in Figure 1, these handles being appropriately connected through a known valve system for causing fluid to flow to or from each piston-cylinder assembly.

A pair of identical beams 34 and 36 are pivoted at their inner ends to the conventional mounting assemblies for the treads 16 of the tractor.

Each beam, for example, the beam 34, consists of a housing 38 which is of channel shape and which opens outwardly. A piston-cylinder assembly 40 (Figure 3) is disposed in the housing 38 and has one end thereof pivoted as at 42 to the housing. The other end is pivoted, as at 44, to a slide 46 which is operable through the open end or outer end of the housing 38.

The illustrated mold board 48 is provided with a bracket on each side thereof which forms a part of a ball and socket assembly. The ball and socket assembly 49 connects the outer end of the slide 46 with one side of the mold board and is attached to the rear surface thereof. The other ball and socket assembly is employed for connecting the slide of the other beam to the mold board similarly. Therefore, upon proper operation of the piston-cylinder assembly 40, the mold board may be urged outwardly at the ends thereof to thereby adjust the same.

Figure 3:
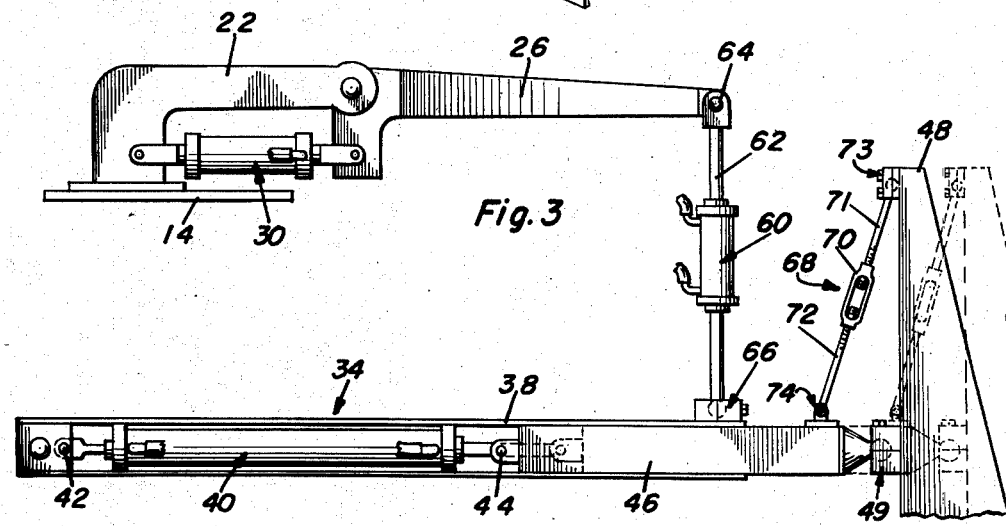
Figure 3 is a side view of the structure in Figure 1, the tractor being omitted.

In Figure 3 there is illustrated extensible means attached to the outer ends of each lift arm 26 and 28 for raising and lowering the beams 34 and 36. The said extensible means consists of a cylinder-piston assembly 60 which has a bifurcated piston rod 62 pivoted by means of a pin 64 to the outer end of the lift arm 26. The lower end of the assembly 60 is connected by means of a ball and socket assembly 66 to the housing 38 of said beam 34. The lift rod 67 is pivoted to the lift arm 28 and is connected by a ball and socket 66 to the beam 36.

An extensible means 68 for tilting the forward edge of the mold board 48 frontwardly or rearwardly is supplied. This means consists of a turnbuckle 70 having rods 71 and 72 extending therefrom, each of which is provided with a pivot assembly. The ball and socket assembly 73 connects the rod 71 with the upper edge of the mold board 48, while the pivot assembly 74 connects the outer end of the rod 72 with the slide 46.

The modification illustrated in Figure 4 differs only slightly from the embodiment of Figure 3. In lieu of the cylinder-piston assembly 60, the applicant has provided a turnbuckle 80 with rods 81 and 82 extending therefrom. The rods are, of course, threaded so that the turnbuckle may act in the proper manner. The upper end of the rod 81 is bifurcated as at 83 and is pivoted to the outer end of the lift arm 26 by means of the pivot pin 85. The outer end of the rod 82 is connected with the housing 38 by means of a ball and socket assembly 86.

In lieu of the extensible means 68, there is provided a cylinder-piston assembly 88 which is connected at its upper end with the top of the mold board 48 by means of a ball and socket assembly 90 and which is connected at its lower end to the slide 46 by means of the pivot assembly 92.

With appropriate valve control to regulate the the flow of fluid from the source of pressure standard in the tractor, the mold board may be lifted, dipped or tilted to substantially any position.

In order to limit objectionable lateral displacement of the beams 34 and 36, the vertical guides 95 and 96 are secured to the tractor by means of the brackets 97 and 98. The guides are engaged by the inner surfaces of the slides of the beams 34 and 36 to limit lateral displacement of said beams.

It is to be noted that the usual mount or mounting assembly for the mold board is carried on the cat or tread housings which have a tendency to rise and dip, depending on the roughness of the land. This, of course, correspondingly lowers or raises the mold board and causes irregular cutting. By using the fenders as mounting devices for the mold board assembly, the operator is able to hold a better grade on rough surfaces. The tractor body, including the fenders, does not dip or lift nearly so much as the cat housings, which will cause the resulting better grade in operation of the device.

Having described the invention, what is claimed as new is:

1. In a tractor having fenders and tread mounting assemblies, a pair of side beams having rear ends pivoted to said assemblies for vertical swinging movement, a mold board, ball and socket connections between the forward ends of the beams and the mold board, supports secured to said fenders, a pair of vertically swingable lift arms carried by said supports, said lift arms extending forwardly from the supports and having depending rear end portions, hydraulically operated means operatively connecting said supports to the rear end portions of said arms for vertically swinging the arms, the forward ends of said arms overlying the forward ends of said beams, a hanger linkage connecting the forward end of one arm to the forward end of the beam it overlies, extensible means connecting the forward end of the other arm to the forward end of the beam it overlies whereby the last named beam may be moved relative to the other beam, and additional extensible means connecting the mold board to the beams for adjusting the mold board relative to said beams and about said ball and socket connections, said beams each comprising a housing to which the linkage and the first named extensible means are connected and slides received in the housing and connected to the mold board by said ball and socket connections, and piston and cylinder assemblies in the housings and connecting the housings to the slides to adjust the slides longitudinally of the housings.

2. In combination with a tractor which has fenders and tread mounting assemblies at opposite sides thereof, a moldboard, a pair of beams at opposite sides of the tractor and having front and rear ends, said beams being pivoted to said assemblies at the rear ends thereof for vertical movement, a pair of vertical guides supported at opposite sides of the tractor for limiting lateral displacement of said beams, a longitudinally adjustable slide carried by each beam and having a front end, means confined within the beams and connected to the slides for adjusting the slides longitudinally of the beams, ball and socket assemblies connecting the front ends of said slides to the rear surface of the moldboard to thereby attach said moldboard to said beams, a pair of supports secured to said fenders and overlying the central portions of said mounting assemblies, a pair of lift arms having depending rear portions and front ends, a common pivot carried by said supports and supporting said lift arms, said lift arms extending forwardly from the supports, means secured to the depending rear portions of said lift arms and to said supports for pivotally operating said lift arms, extensible means secured to the front end of one of said lift arms and to one of said beams for selectively raising and lowering said one of said beams to thereby tilt said moldboard, a connecting linkage between the other lift arm and the other beam, and hydraulically actuated extensible means secured to the front ends of said slides and to the upper part of said moldboard to adjust said moldboard about said ball and socket assemblies.

3. In combination with a tractor which has fenders and tread mounting assemblies at opposite sides thereof, a moldboard, a pair of beams at opposite sides of the tractor, each beam being pivotally mounted to one of said assemblies at a rear end thereof for vertical swinging movement, a pair of vertical guides supported at opposite sides of the tractor for limiting lateral displacement of said beams, a longitudinally adjustable slide carried by each beam and having a front end, means carried within the beams and attached to the slides for adjusting the slides longitudinally of the beams, ball and socket assemblies connecting the front ends of the slides to the rear surface of the moldboard to thereby attach said moldboard to said beams, a pair of supports secured to said fenders and overlying the central portions of the mounting assemblies, a pair of lift arms having rear portions and outer ends, a common pivot carried by said supports and supporting said lift arms, said lift arms extending forwardly from the supports past the mounting assemblies, means secured to the rear portions of said lift arms and to said supports for pivotally operating said lift arms, extensible means secured to the outer end of one of said lift arms and to one of said beams for selectively raising and lowering one of said beams to thereby tilt said moldboard, a connecting linkage between the outer end of the other lift arm and the other beam, and hydraulically actuated extensible means secured to one of said slides, and the upper part of the moldboard to adjust said moldboard about said ball and socket assemblies.

4. In combination, a tractor having treads and mounting assemblies therefor together with fenders disposed above the treads, a moldboard, a pair of beams at opposite sides of the tractor having inner ends, each beam comprising a housing pivoted at the inner end of the beam to one of the mounting assemblies for vertical swinging movement of the beam and having an open end at the outer end of the beam, a pair of vertical guides mounted at opposite sides of the tractor for limiting lateral displacement of said beams, a slide disposed in each housing and operable through the open end of the housing and having an outer end, a piston and a cylinder arranged in each housing and secured to the slide to move the slide outwardly and inwardly of said housing, a ball and socket assembly at the outer end of each slide connecting said slides to said moldboard, a pair of supports secured to the fenders, a single pivot pin extending horizontally through the supports, cranks forming lift arms with said pivot pin carried thereby and carried by the supports, said lift arms having inner and outer ends, means secured to the inner ends of the lift arms for pivotally operating said lift arms, extensible means pivotally secured to the outer end of one of said lift arms and to one of said housings for raising of said housing, a linkage connecting the other lift arm to the other housing, and piston and cylinder assemblies pivotally secured to the outer ends of said slides and to said mold board for tilting said moldboard.

References Cited in the file of this patent

UNITED STATES PATENTS

| Number | Name | Date |
| --- | --- | --- |
| 1,974,520 | Stewart | Sept. 25, 1934 |
| 1,976,597 | Bird | Oct. 9, 1934 |
| 2,075,482 | Thorpe | Mar. 30, 1937 |
| 2,137,829 | Austin | Nov. 22, 1938 |
| 2,160,595 | Le Bleu | May 30, 1939 |
| 2,185,015 | Low | Dec. 26, 1939 |
| 2,187,072 | Le Bleu | Jan. 16, 1940 |
| 2,239,943 | Sword | Apr. 29, 1941 |
| 2,269,775 | Le Bleu | Jan. 13, 1942 |
| 2,303,379 | Mork | Dec. 1, 1942 |
| 2,485,407 | Peterson | Oct. 18, 1949 |
| 2,565,337 | Allan | Aug. 21, 1951 |